(12) United States Patent
Kiso

(10) Patent No.: US 6,604,700 B2
(45) Date of Patent: Aug. 12, 2003

(54) TAPE CASSETTE

(75) Inventor: Hiroyuki Kiso, Miyagi (JP)

(73) Assignee: Sony Corporation (JP)

( * ) Notice: Subject to any disclaimer, the term of this patent is extended or adjusted under 35 U.S.C. 154(b) by 61 days.

(21) Appl. No.: 09/974,820

(22) Filed: Oct. 12, 2001

(65) Prior Publication Data

US 2002/0074440 A1 Jun. 20, 2002

(30) Foreign Application Priority Data

Oct. 30, 2000 (JP) .......................................... 2000-331395

(51) Int. Cl.$^7$ ............................................. G11B 23/087
(52) U.S. Cl. ........................ 242/345; 242/614; 360/132
(58) Field of Search ................... 242/345, 614; 360/132

(56) References Cited

U.S. PATENT DOCUMENTS 4,932,604 A    6/1990   Maehara et al.

FOREIGN PATENT DOCUMENTS

| EP | 588 219 | 3/1994 |
|----|---------|--------|
| EP | 682 342 | 11/1995 |
| JP | 10-334636 | 12/1998 |
| JP | 10-340565 | 12/1998 |
| JP | 2000-30401 | 1/2000 |

*Primary Examiner*—John Q. Nguyen
(74) *Attorney, Agent, or Firm*—Rader, Fishman & Grauer & PLLC; Ronald P. Kananen

(57) ABSTRACT

In an inner surface of a lower flange of the magnetic tape reel, 6 concave portions each shaped in nearly as isosceles triangle are made formed at even angle intervals of 60 degrees with their circumferential cross-section area being larger as approaching to a hub. When a magnetic tape is wound on the hub, air which exists between a tape-winding surface of the hub or the tape already wound and the tape to be wound further is guided to the concave portions, and an amount of wound-in air becomes less in the inner side and large in the outer periphery. Consequently, a pressure of winding the tape tight at the outer periphery does not reach the inner side, so that winding irregularities or deformation of the tape do not occur.

11 Claims, 15 Drawing Sheets

TAPE CASSETTE

CROSS REFERENCES TO RELATED APPLICATIONS

The present invention claims priority to priority document No. P2000-331395 filed in Japan on Oct. 30, 2000, and incorporated by reference herein.

BACKGROUND OF THE INVENTION

1. Field of the Invention

The present invention relates to a tape cassette, and more specifically to a tape cassette that has a pair of tape reels capable of winding a tape, typically a magnetic tape for example, there-between into a good shape without causing winding irregularities and deformations such as wrinkles of the wound tape on the tape reels.

2. Description of the Related Art

When considering a magnetic tape for recording and reproducing video and/or audio signals among various tapes used in various technical fields, there are various systems for recording and reproducing audio and video signals, such as the β-VTR system, the VHS-VTR system or the Digital VTR system. A fundamental structure of a tape cassette to be used for each of above mentioned VTR (Video Tape Recorder) systems is basically the same, in which a tape cassette shell houses a take-up reel and a supply reel for winding the magnetic tape. As a matter of course, besides the magnetic tape as described above, there are various kinds of tapes to be wound on tape reels, such as ink ribbon tapes for printers, carrier tapes for electronic parts or the like.

A fundamental structure of each of tape reels within a tape cassette is explained with reference to FIG. 14 and FIG. 15, wherein FIG. 14 shows a perspective view of a tape reel 10 used for a conventional tape cassette and FIG. 15 shows a sectional view of the conventional tape reel 10. An upper flange 2 and a lower flange 13 are provided at a top end and a bottom end of a hub 4 which is positioned at a center of the tape reel 10 to wind a magnetic tape in order to prevent winding irregularities or winding collapse of the magnetic tape as well as to prevent damages of end face edges of the wound magnetic tape. One of the flanges 2 and 13 (namely the lower flange 13 in case of FIGS. 14 and 15) is molded integrally with the hub 4 and the other flange on the other side (namely the upper flange 2 in case of FIGS. 14 and 15) is molded separately as another body, and this upper flange 2 is welded integrally with the upper end face of an inner cylinder 4a of the hub 4. Inside the welded portion, a spring unit 6 having a metallic spherical body is held between the inner cylinder 4a and the upper flange 2. As shown in FIG. 16, this spring unit 6 contacts with a tape reel presser 23 that is provided on an upper shell 22 of the tape cassette and depresses the tape reel 10 downward by a coil spring 24 provided between the upper shell 22 and the tape reel presser 23. Incidentally, regarding flanges of a tape reel, a one-flange type tape reel comprises a hub and a lower flange, besides a two-flange type tape reel comprises a hub, a lower flange and a upper flange as described above.

In manufacturing the magnetic tape cassette, the magnetic tape is wound on a tape winding surface 4q of the hub 4 by a tape winding device called a tape winder. At this time, there easily occur winding irregularities (irregularities on the side surfaces of the wound magnetic tape) and air is considered as the cause of the winding irregularities, wherein the air is caught into between the hub 4 and the magnetic tape being wound thereon, and between the magnetic tape already wound and the magnetic tape being wound up thereon. Besides, there is the case where the magnetic tape is deformed (for instance, creases in the width direction of the magnetic tape that is slightly piled up). These problems tend to easily occur on the inner side of the wound tape.

FIG. 17 shows a plan view of the lower flange 13 of the tape reel 10 used in the conventional tape cassette (hereinafter abbreviated as the tape reel 10), and illustrates the inner surface thereof. As shown in FIG. 17, on the inner surface of the lower flange 13, 12 of concave portions 18 are formed as to extend in a radial direction at even angle intervals of 30 degrees. These concave portions 18 are provided so as to escape the air that is caught in between the magnetic tape at the time of winding up thereof as soon as possible, and each of the concave portions 18 is formed gradually wider as approaching to the outer periphery. However, even in the tape reel 10 having such concave portions 18 on the lower flange 13, generation of winding irregularities has not been prevented substantially due to inadequate or improper escape of the air. Furthermore, by escaping the air being caught together with the running magnetic tape, the pressure given from outer periphery of the wound magnetic tape to inner side of the wound magnetic tape is increased. Accordingly as shown in FIG. 18, at the inner side where a winding condition of the magnetic tape T is loose, the surface of the wound magnetic tape forms moderate wavy bumps and dips, which causes problems of [crease] or [looseness].

SUMMARY OF THE INVENTION

The present invention has been made in view of the above-described problems, and when winding up a tape, one aspect of the present invention is to provide a tape cassette having tape reels capable of winding up the tape uniformly without causing winding irregularities and without incurring deformation.

The above-described problems may be solved by a structure of an aspect of the present invention, and means of solving the problems are described in detail hereunder.

A tape cassette according to one aspect of the present invention includes at least one tape reel having a flange at a hub unit on which a tape is wound. Further in the tape cassette of the invention, a flange of the tape reel has at least one concave portion to escape the air formed within the inner surface of the flange, and at least one of such tape reels is included within a tape cassette shell. The concave portion provided on the inner surface of the flange becomes larger at a circumferential cross-sectional area as approaching to the inner side nearer to the hub unit.

In such tape cassette, each of the concave portions of the flanges of the tape reel has the larger circumferential cross-sectional area as approaching to the inner side nearer to the hub unit, so that an amount of escaped air becomes more as approaching to the inner side. Accordingly, in a state that the tape is wound up, an amount of the air caught in between the tape may become less as approaching to the inner side, and more as approaching to the outer periphery, so that a pressure of the wound magnetic tape at the outer periphery may be reduced and may not reach the inner side, and the magnetic tape at the inner side may not be deformed when wound up. At the same time, an amount of air being caught by the concave portions may be restrained so that slide to the width direction between the overlapped magnetic tape may be inhibited with a result that winding irregularities may be effectively prevented and a good shape may be maintained.

In the tape cassette according to the present invention, the concave portions of the flange of the tape reel may have basically constant depth to the lateral direction, and may have broader width as approaching to the inner side nearer to the hub unit. In such tape cassette, mechanical strength of the tape reel may not be decreased by the concave portions, and an amount of the escaped air may be increased as approaching to the inner side and the wound form of the tape becomes a proper wound form.

In the tape cassette according to the present invention, the concave portions may be such that a cross-sectional form to the radial direction may have substantially constant depth. In such the tape cassette, an amount of escaped air may be set up by the width of the concave portions.

In the tape cassette according to the present invention, the concave portions may be such that a cross-sectional form to the radial direction may be deeper as approaching to the inner side. In such the tape cassette, an amount of escaped air may further be increased gradually as approaching to the inner side to provide even more proper wound form.

In the tape cassette according to the present invention, corner sections from the wall surface to the bottom surface of the concave portions of the tape reel may be made rounded to form curved surfaces. In such tape cassette, smooth flow of the air may be created at the concave portions when the tape reel rotates to effectively restrain the amount of air being caught with the wound tape.

In the tape cassette according to the present invention, the concave portions may be provided by plural number, and may be disposed at even angle intervals with the hub unit as the center. In such the tape cassette, the tape reel may have a good rotation balance, so that there may occur no tape reel deflection at the time of high-speed rotation.

In the tape cassette according to the present invention, a plurality of the concave portions of the flange of the tape reel may be disposed in proximity to each other around the outer periphery of the hub. In such the tape cassette, the air being caught may be escaped in comparatively equal quantity around the entire rim of the tape reel when the magnetic tape is wound up.

As described above, in a tape cassette of the present invention, there is provided at least one concave portion on an inner surface of a flange of a tape reel included in a cassette shell, wherein a cross-sectional area, that is, a cross-sectional area made by an arc-shaped cross section is made larger as approaching to the inner side nearer to a hub unit. In the case of one-flange type tape reel, the concave portions are provided on an inner surface of the flange where a tape is wound. In the case of the two-flange type tape reel, such concave portions may be provided on both opposing inner sides of the two flanges or on an inner side of one of flanges of the tape reel.

The concave portions may be one provided on the inner surface of the flange or plural numbers. In the case of providing a plurality of concave portions, it is desirable that they are disposed at even angles with a hub unit as their center. The concave portions may be made formed between the position tangent to the hub unit and the outer rim on the inner surface of the flange. Considering that winding irregularities or deformation of the tape are easy to occur on the inner side of winding, it is desirable that the concave portions are made formed on the way to the outer periphery from the position tangent to the hub unit. It is needless to say that they may be made formed in the shape covering from the position tangent to the hub unit to the outer periphery. In that case, the concave portions may have a shape which has the same width from the position tangent to the hub unit to the outer periphery.

It is important that the concave portions should have a large cross-section area as approaching to the inner side nearer to the hub unit. Namely, for the wound-up tape, winding irregularities or deformation are easy to occur on the inner side, so that, to prevent such occurrence, it is important that an amount of the air being caught should be made little on the inner side, and for that purpose, an amount of escaped air should be made more as approaching to the inner side. In order that the cross-section area of the concave portions should be made larger as approaching to the inner side, the shape of the concave portions may be made wider as approaching to the inner side, or the cross-sectional shape thereof may be made deeper as approaching to the inner side, or both shapes thereof may be adopted. For the concave portions whose depth is substantially constant but width is made wider as approaching to the inner side, an amount of air to be escaped may visually be recognized by the size of width and an appropriate shape of the concave portions may easily be obtained. Also by making the depth deeper as approaching to the inner side, the air may be effectively escaped at the inner side. However, if the depth of the concave portions is made too deep, there is a fear that mechanical strength of the flange may be impaired, so that it is desirable for the inner side to be made wider, and by doing so, it may become easy for the air to be escaped evenly to the circumferential direction. Furthermore, it is desirable that the concave portions should have a curved surface from the inner wall surface to the bottom surface. In comparison with the case that the inner wall surface and the bottom surface form square, air may flow smoothly and be effectively escaped.

When a plurality of the concave portions are provided on the tape reel, it is not necessary for the plurality of the concave portions to have the same stereoscopic shape, but for being capable of obtaining good rotation balance, it is desirable for them to be disposed symmetrically with respect to the hub as the center. When the plurality of the concave portions are provided, mutual proximity of the plurality of the concave portions at the outer rim position of the hub unit is preferable because air comes to be escaped in comparatively equal amount all around the tape reel, but such disposition of the concave portions is not an essential condition.

BRIEF DESCRIPTION OF THE DRAWINGS

FIGS. 9A and 9B are top views showing wound forms of magnetic tapes on the tape reels, wherein FIG. 9A shows a tape reel of a magnetic tape cassette of the present embodiment and FIG. 9B shows a tape reel of a conventional magnetic tape cassette;

FIGS. 11A and 11B are graphs showing an error rate regarding respective signals reproduced from a magnetic tape cassette by 4 magnetic heads of a video tape recorder, wherein FIG. 11A shows the case of the tape reel of the present embodiment and FIG. 11B shows the case of a conventional tape reel;

FIGS. 12A and 12B are graphs showing shapes of signal outputs of Time Code signal, Cue Audio signal and Control Track (CTL) signals of the magnetic tape to the longitudinal direction, wherein FIG. 12A shows the case of the tape reel of the present embodiment and FIG. 12B shows the case of a conventional tape reel;

FIGS. 13A, 13B and 13C are views showing deformations of plane shapes of the concave portions which are made to form on the tape reel, wherein FIG. 13A shows that the apexes of the concave portions come into contact with the outer rim of a lower flange, FIG. 13B shows that the concave portion have the shape of (¼) circle, and FIG. 13C shows that the concave portions have the half elliptic shape;

DETAILED DESCRIPTION OF THE PREFERRED EMBODIMENTS

Next, a magnetic tape cassette according to the present invention is specifically described as one of typical embodiment of the present invention with reference to the accompanying drawings.

Figure 1:
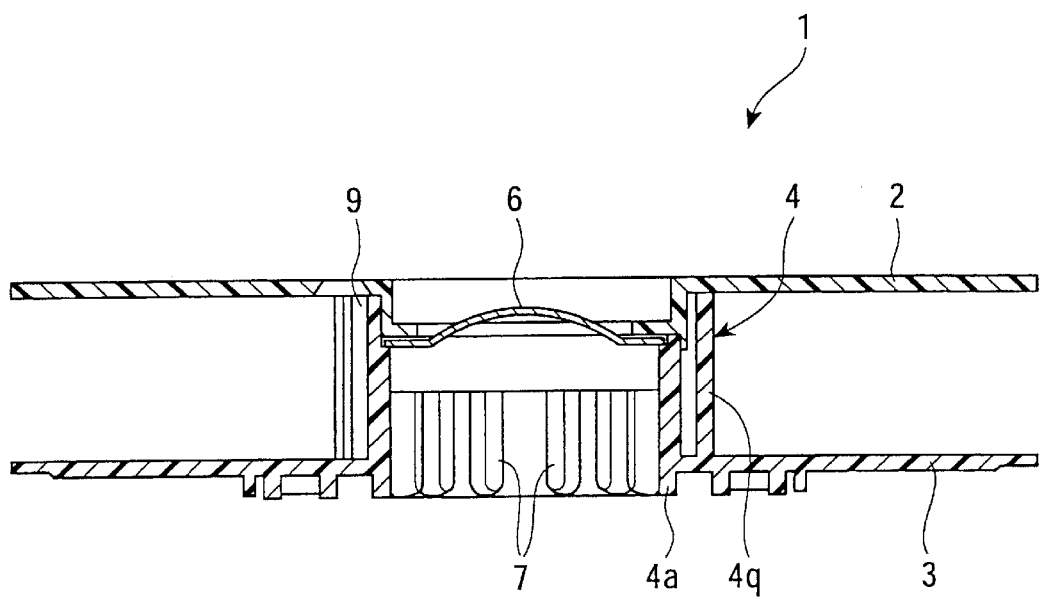
FIG. 1 is a sectional view of a tape reel used for a magnetic tape cassette of one embodiment of the present invention.
Figure 2:
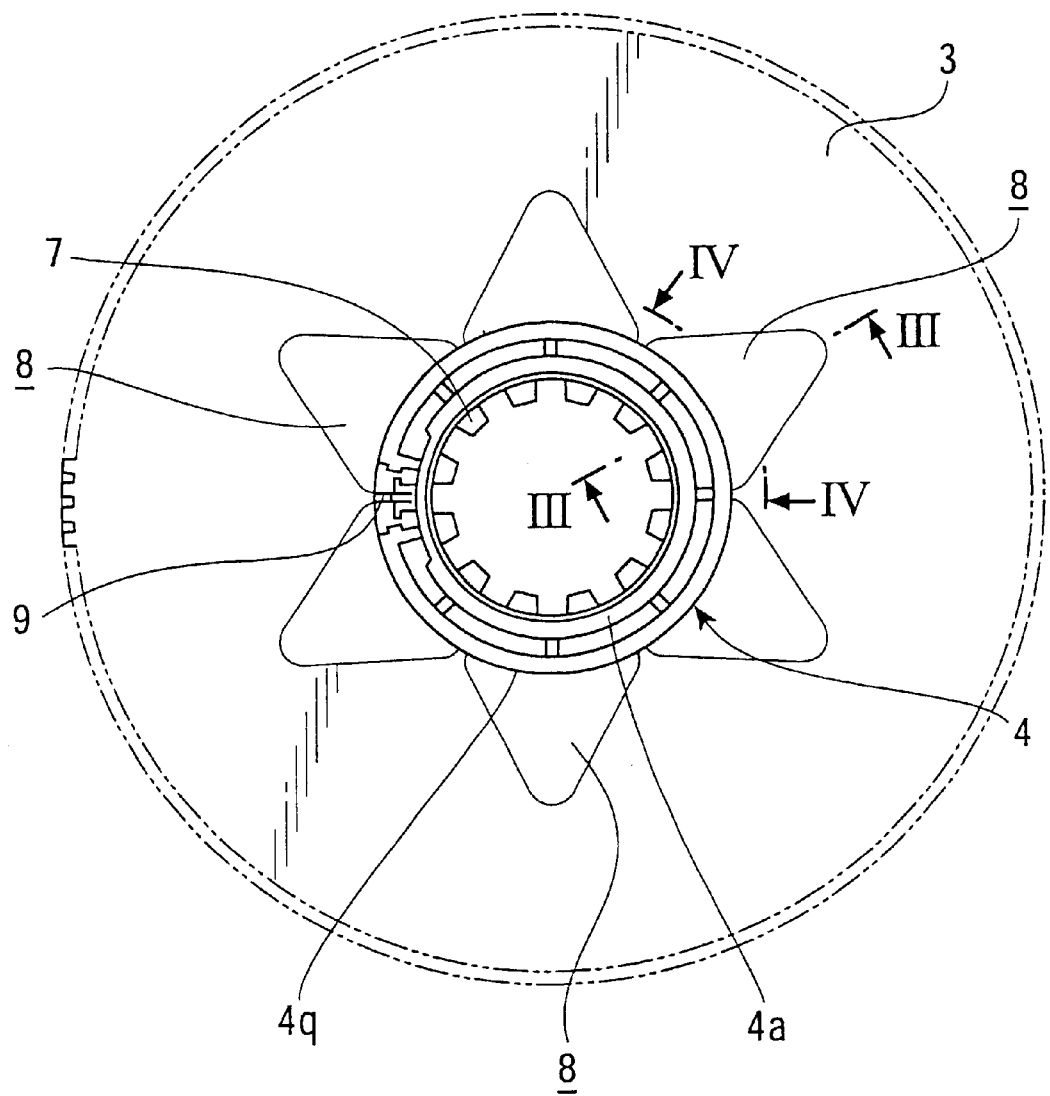
FIG. 2 is a plan view of a lower flange of the tape reel shown in FIG. 1.
Figure 14:
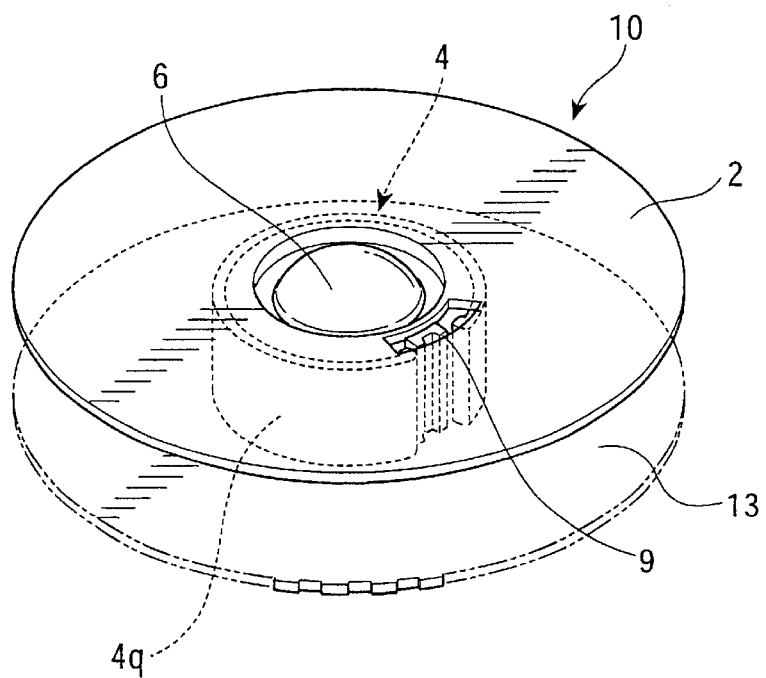
FIG. 14 is a perspective view of a tape reel used for a conventional magnetic tape cassette.
Figure 15:
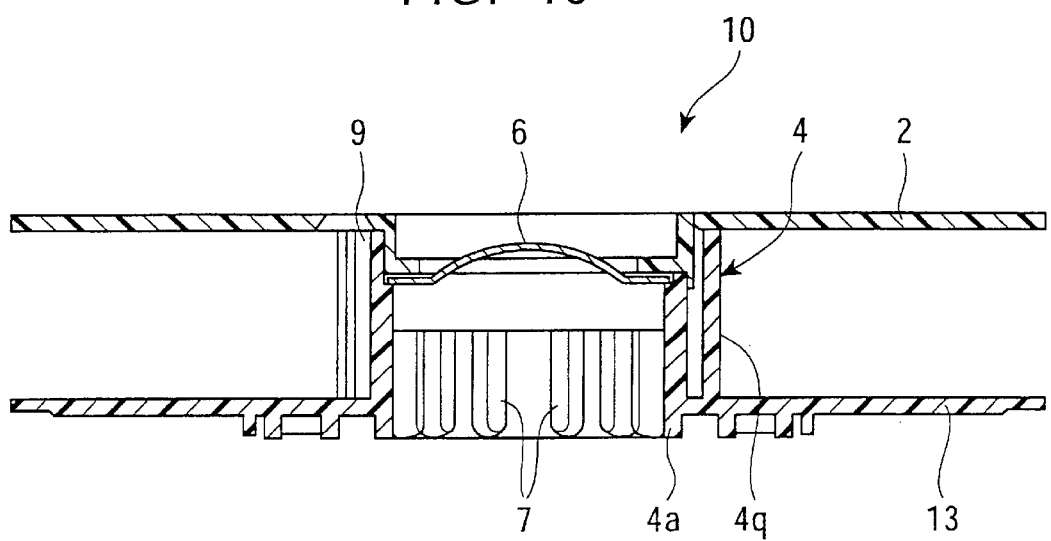
FIG. 15 is a longitudinal sectional view of the tape reel of FIG. 14.
Figure 16:
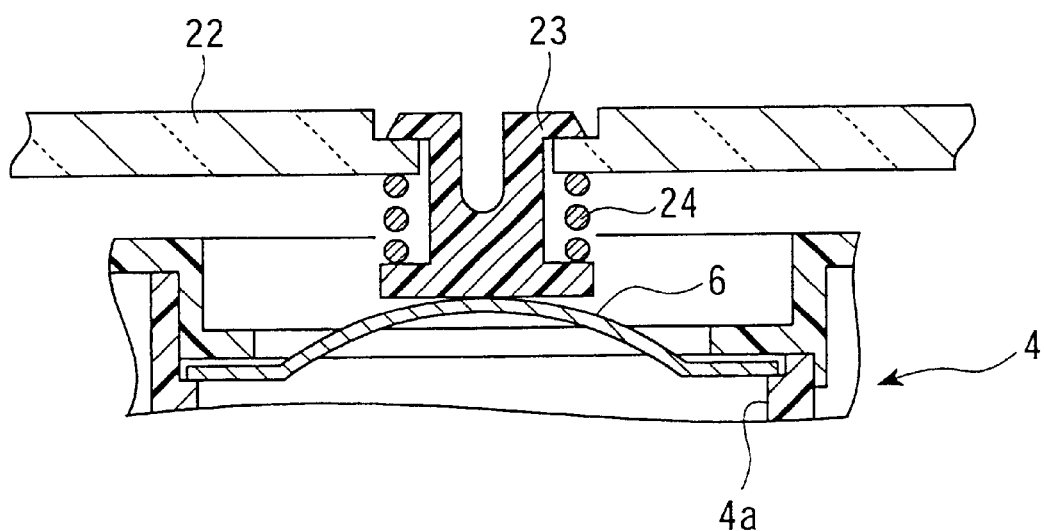
FIG. 16 is a fragmentary sectional view showing the state that the tape reel of FIG. 14 is energized downward within a conventional magnetic tape cassette.

FIG. 1 is a sectional view of a tape reel 1 for winding a magnetic tape of a video tape cassette to be used for a broadcasting station, for example. As shown in FIG. 1, the tape reel 1 of the present embodiment comprises an upper flange 2 and a lower flange 3 with a hub 4, and this structure is the same as the conventional tape reel 10 shown in FIGS. 14 and 15. As this structure is the same as that of a conventional tape reel 10, the same numerals are given to corresponding elements, so that detailed descriptions about them are omitted. FIG. 2 is a plan view of the lower flange 3 and the hub 4. As shown in FIG. 2, 6 of the concave portions 8 each of which is made wider as approaching nearer to the hub 4 are formed at even angles of 60 degrees on an inner surface of the lower flange 3.

Figure 3:
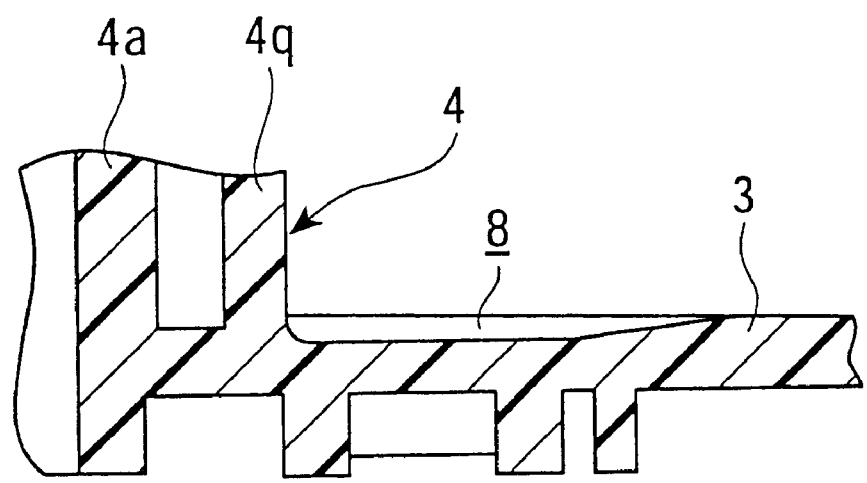
FIG. 3 is a sectional view taken along a line III—III of FIG. 2.
Figure 4:
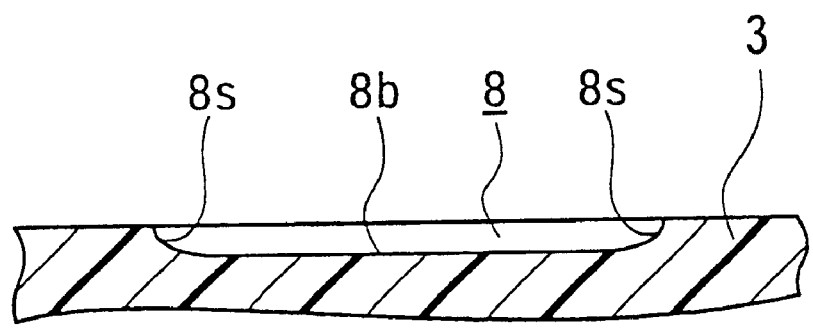
FIG. 4 is a sectional view taken along a line IV—IV of FIG. 2.

Furthermore, FIG. 3 is a sectional view taken along the line III—III in FIG. 2, namely, taken along the radial direction of the concave portions 8, and each of the concave portions 8 is formed shallower as approaching to the outer periphery. FIG. 4 is a sectional view taken along the line IV—IV in FIG. 2, namely, a circumferential sectional view of one of the concave portions 8, wherein corner sections made by wall surfaces 8s and bottom surfaces 8b are formed in curved surfaces. As apparent from FIG. 3, FIG. 4 and the circumferential cross-sectional line IV—IV of FIG. 2, each of the circumferential cross-section area of the concave portions 8 is made larger as approaching to the inner side toward the hub 4.

Figure 5:
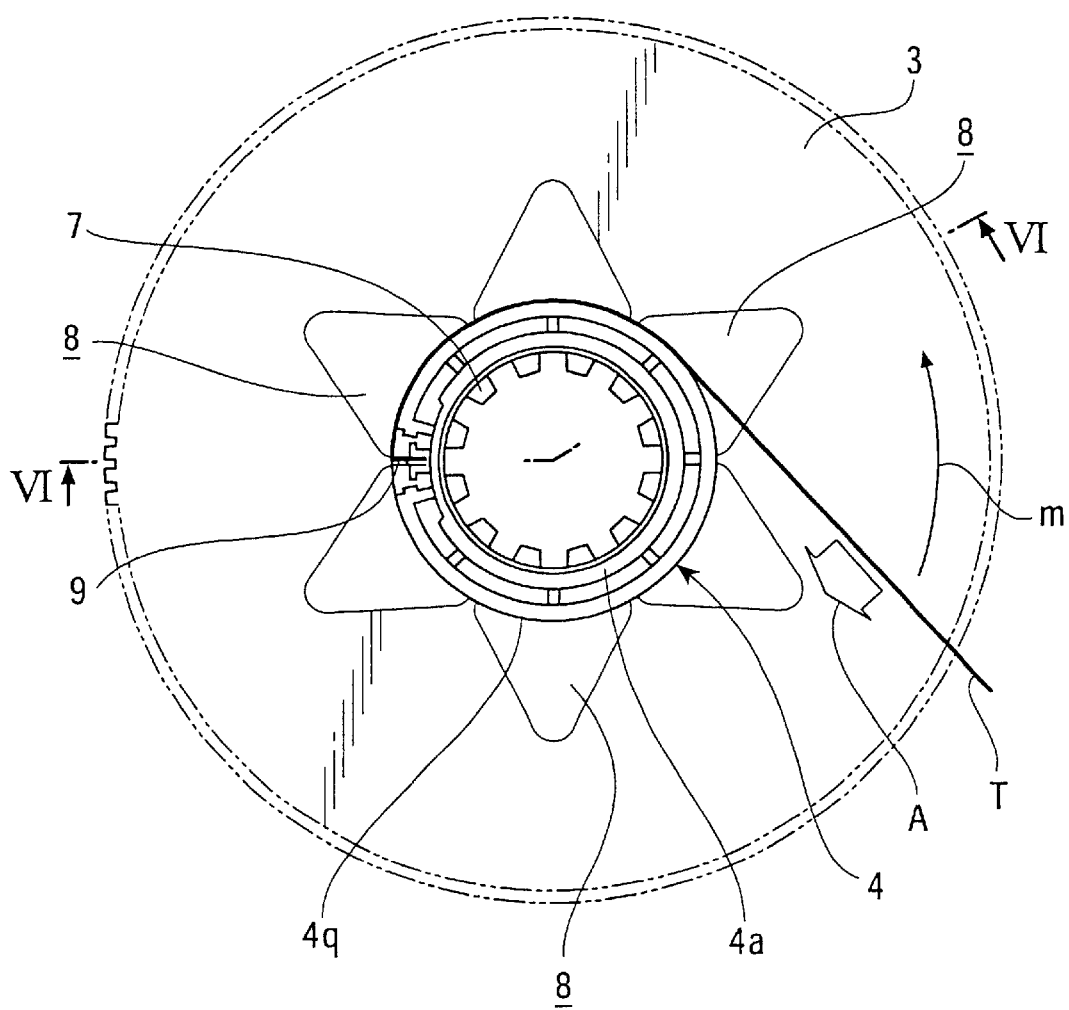
FIG. 5 is a plan view referring to FIG. 2 and shows operation of concave portions of the tape reel together with FIG. 6.
Figure 6:
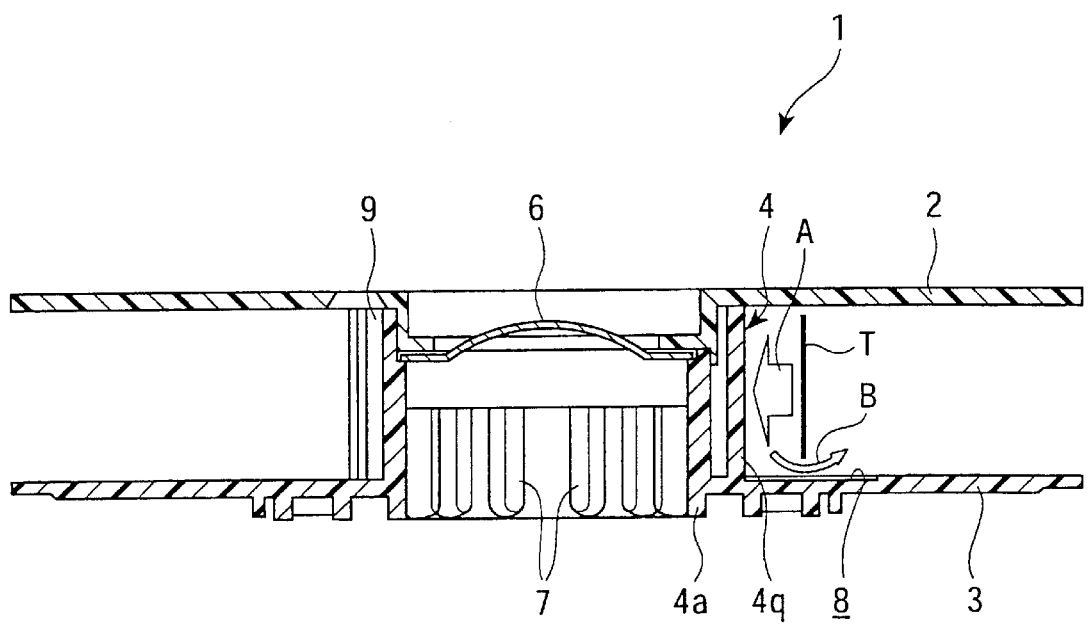
FIG. 6 is a sectional view referring to FIG. 1 and shows operation of the concave portions of the tape reel together with FIG. 5.

Next, the operation of the concave portions 8 formed on the lower flange 3 is explained with reference to FIG. 5 similar to FIG. 2, and FIG. 6 that is a sectional view taken on the line VI—VI of FIG. 5. When a video tape cassette is installed on a tape winder or a VTR(Video Tape Recorder), a tape reel driving shaft (not shown) of the tape winder or the VTR is engaged with engaging teeth 7 of the hub 4. By rotating the tape reel driving shaft, the tape reel 1 is rotated to the direction shown by an arrow m in FIG. 5, and the magnetic tape T whose tape top is latched to the hub 4 by a tape clamp piece is wound on a tape winding surface 4q of the hub 4 with a predetermined winding (take-up) tension. Between the tape winding surface 4q of the hub 4 and the magnetic tape T wound thereon, or between the magnetic tape T already wound on the hub 4 and the magnetic tape T to be further wound thereon, air is caught in as shown by an arrow A with an outline type face. At this time, as shown by an arrow B with an outline type face in FIG. 6, a part of the air caught there-between is guided to the concave portions 8 formed on the inner surface of the lower flange 3 and escaped. As shown in FIGS. 5 and 6, an underside edge of the magnetic tape T is not scraped on the concave portions 8, so that the edge is not damaged and signal dropout caused by foreign matters in the form of fine powder on the magnetic tape produced by such scraping is restrained.

The larger the circumferential cross-section area of the concave portions 8 is, the more the amount of air to be escaped becomes. Therefore, as approaching to the inner sides of the concave portions 8 that have larger circumferential cross-section area, the amount of the air to be escaped becomes more, and the amount of the air being caught in between the magnetic tape T becomes less. In contrast with this, as approaching to the outer peripheries of the concave portions 8 where the circumferential cross-section area becomes smaller after the diameter of the wound tape becomes larger by progress of winding, the amount of the air to be escaped becomes less, and the amount of the air caught between the magnetic tape T becomes more.

Namely, the magnetic tape T wound or taken up with the predetermined tension is stretched a bit within an elastic limit of the tape and has a contraction stress. However, as the amount of air being caught is more as approaching to the outer periphery, the winding pressure from the outer periphery to the inner side is reduced by depressing the air between the magnetic tape T on the outer periphery and such pressure does not reach the inner side. Therefore, [crease] or [looseness] caused by gentle wavy bumps and dips on the surface of the wound magnetic tape of the inner side as seen in the case of the conventional tape 10 is not produced in the case of using a tape cassette in which the tape reel 1 of the present embodiment is used. Also at the inner side, the amount of the air being caught is restrained by the concave portions 8, so that frictional resistance between the magnetic tape on the inner side becomes large, and slide in the width direction between the magnetic tape caused by the winding pressure from the outer periphery is restrained, preventing occurrence of winding irregularities.

Figure 17:
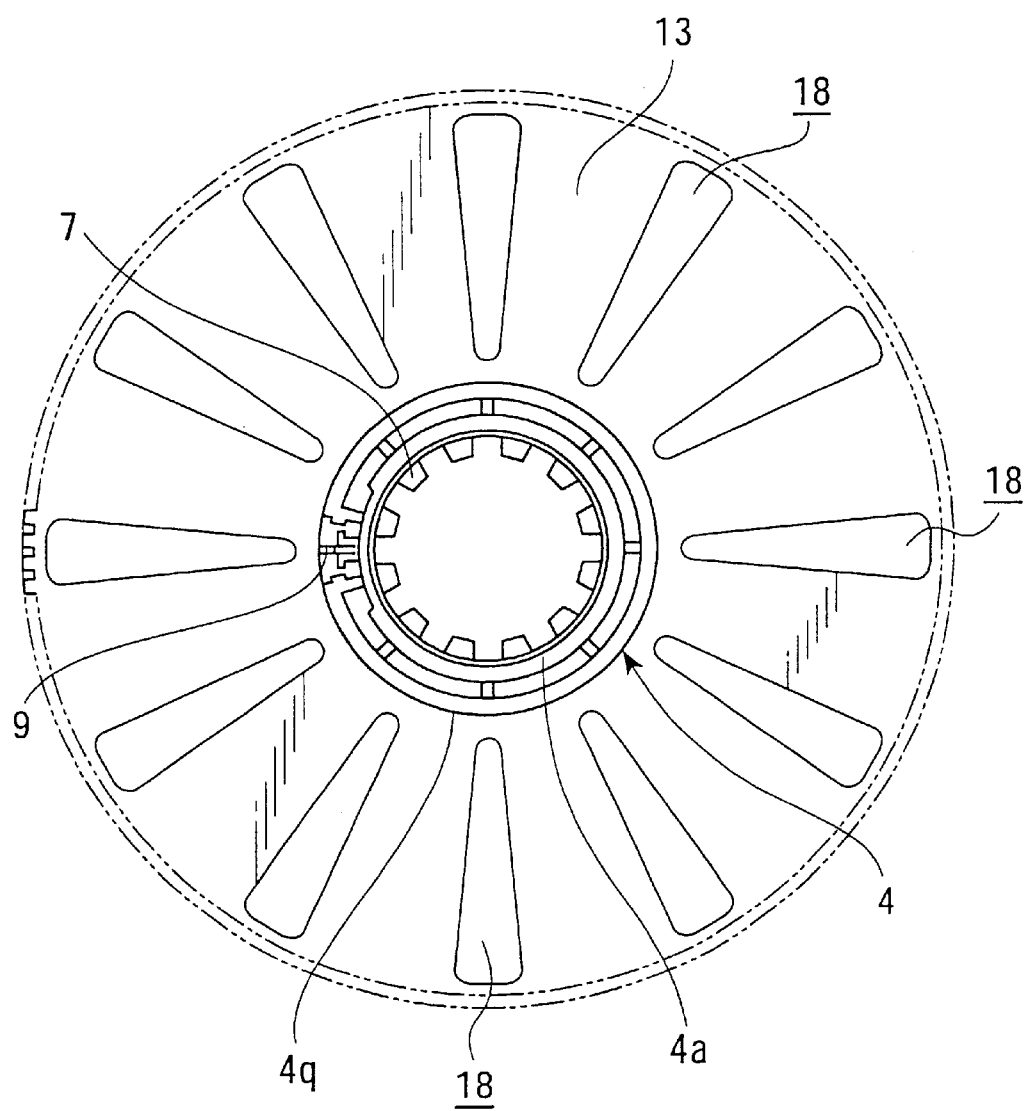
FIG. 17 is a plan view of the tape reel of FIG. 14.
Figure 18:
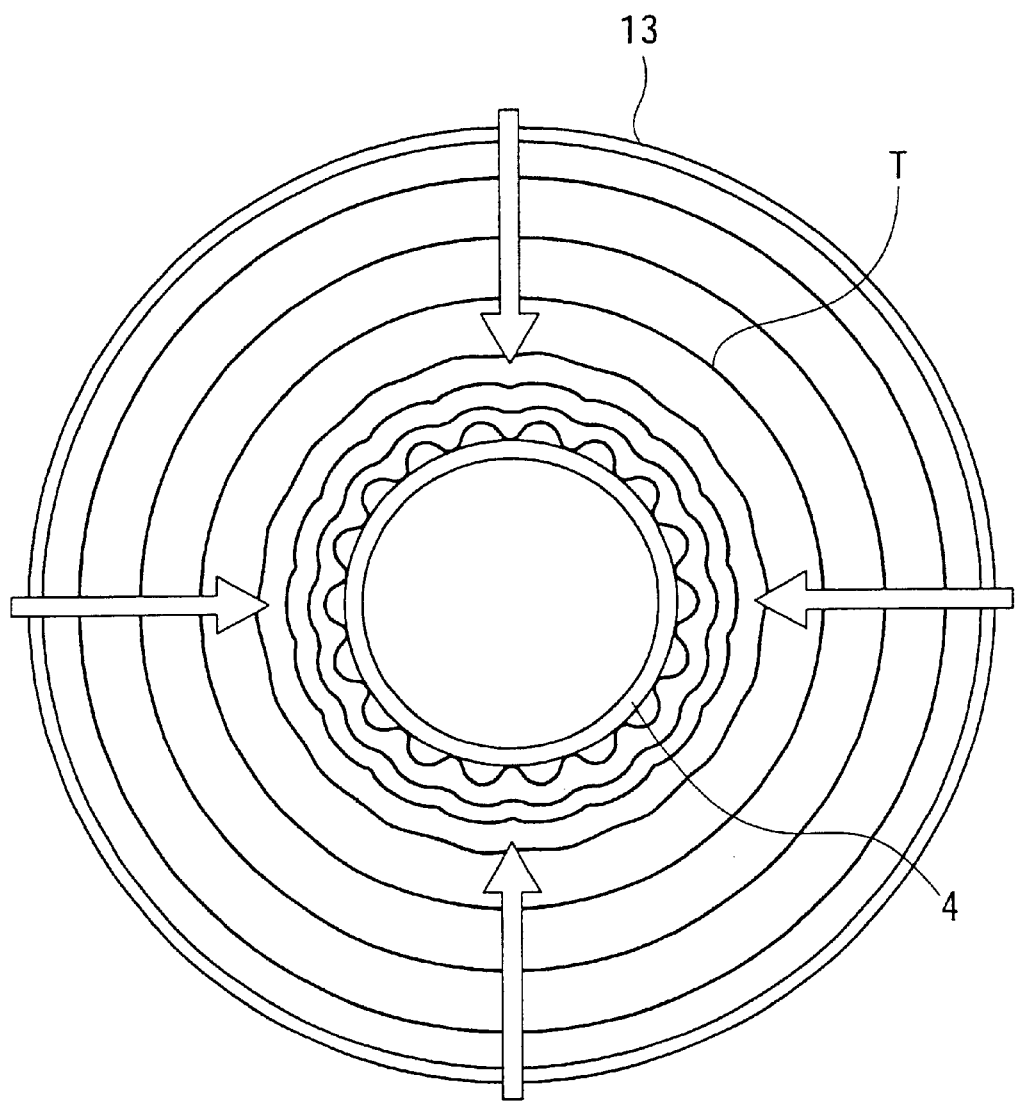
FIG. 18 is a view schematically showing the state of forming gentle wavy bumps and dips on the circumference of the magnetic tape from the outer rim of the wound tape to the loosely wound inner rim caused by winding pressure.

Next, several tests have been made under the condition where the magnetic tape T is wound by a tape winder under the predetermined condition, by comparing winding form and winding looseness of the magnetic tape on the tape reel, error rate of reproduced signal from a video track and output signal shape recorded on a longitudinal track with regard to the tape reel 1 of the magnetic tape cassette according to the present embodiment and the tape reel 10 of the conventional tape cassette. In this case, the tape reel 1 for the test comprises the hub 4 having a diameter of 45 mm, the upper flange 2 and the lower flange 3 where the concave portions 8 are formed as shown in FIG. 5, and the tape reel 10 for the test comprises the hub 4 having the same diameter of 45 mm, the upper flange 2 and the lower flange 13 where the concave portions 18 are formed as shown in FIG. 17. Their results are provided hereunder.

【Test Condition】

For the test, a magnetic tape using polyethylene terephthalate (PET) as a base film was used and the test was made under the condition described below.

[Magnetic Tape Used In This Experiment]

Base film: PET, width of ¾"($\approx$19 mm), thickness of 8.8 $\mu$m

Back coating: thickness of 0.7 $\mu$m

Magnetic layer: metal magnetic material, thickness of 3.2 $\mu$m

Coefficient of friction: equal to or below 0.3

Measuring environment was such that under the condition of temperature of 40° C. and humidity of 80% RH, a dynamic friction measuring machine was used, wherein a surface of 0.2S stainless steel of the dynamic friction measuring machine was contacted with surfaces of a magnetic recording surface and a back coating surface of the magnetic tape. Measurement was conducted by transporting the magnetic tape under a winding or take-up tension of 150 gf ($\approx$1.47N) and a winding speed of 9.5 cm/sec.

[Winding Speed]

Winding speed: 8 m/sec

Acceleration : 1 m/sec$^2$

Deceleration : 1 m/sec$^2$

Figure 7:
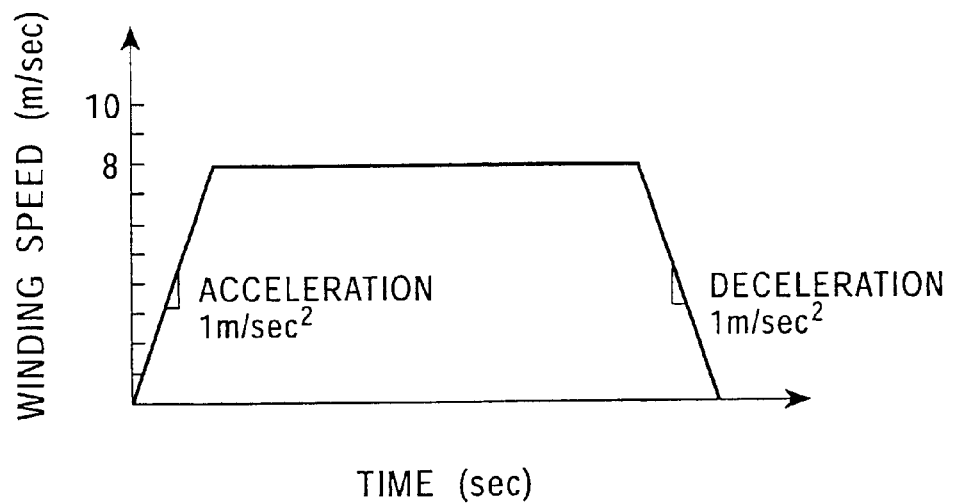
FIG. 7 is a graph showing an elapsed time with respect to winding speed of a magnetic tape by a winding test regarding the tape reel of the embodiment of the present invention and a conventional tape reel.

FIG. 7 is a graph showing an elapsed time with respect to the winding speed. The horizontal axis refers to the time and the vertical axis refers to the winding speed. The rising and falling gradients correspond respectively to an acceleration speed and a deceleration speed of the magnetic tape.

Incidentally, the winding of the magnetic tape is generally conducted within the range of a winding speed of 1 to 20 m/sec, the acceleration and the deceleration speeds of 0.1 to 10 m/sec$^2$.

[Winding Tension]

Beginning of winding: 0.8N

End of winding : 0.6N

Figure 8:
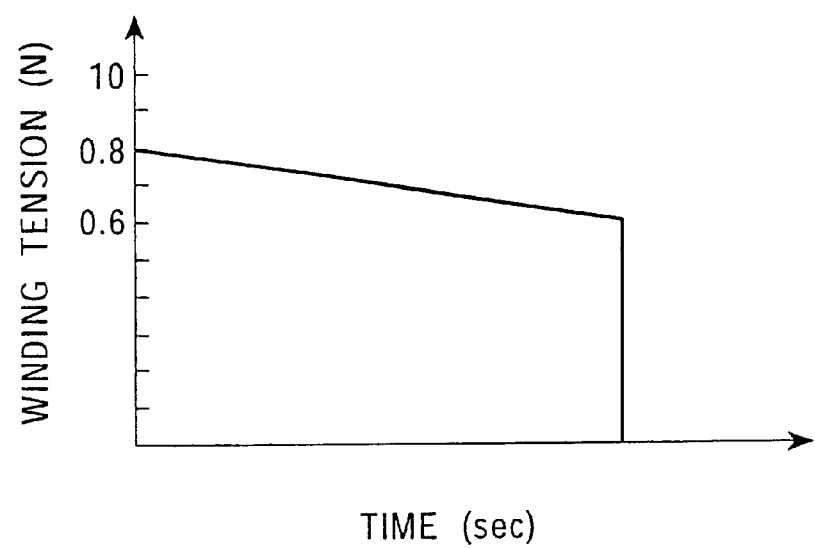
FIG. 8 is a graph showing an elapsed time with respect to winding tension of the magnetic tape by the same winding test as FIG. 7.

FIG. 8 is a graph showing an elapsed time with respect to the winding tension. The horizontal axis refers to the time and the vertical axis refers to the winding tension.

Incidentally such winding is generally conducted within the range of winding tension of 0.1 to 2N.

【Test Result】

[Winding Shape]

Figure 9A:
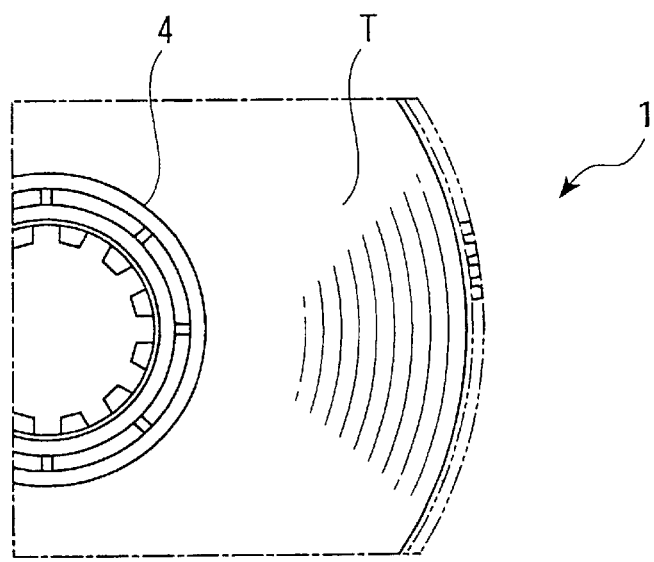
Figure 9B:
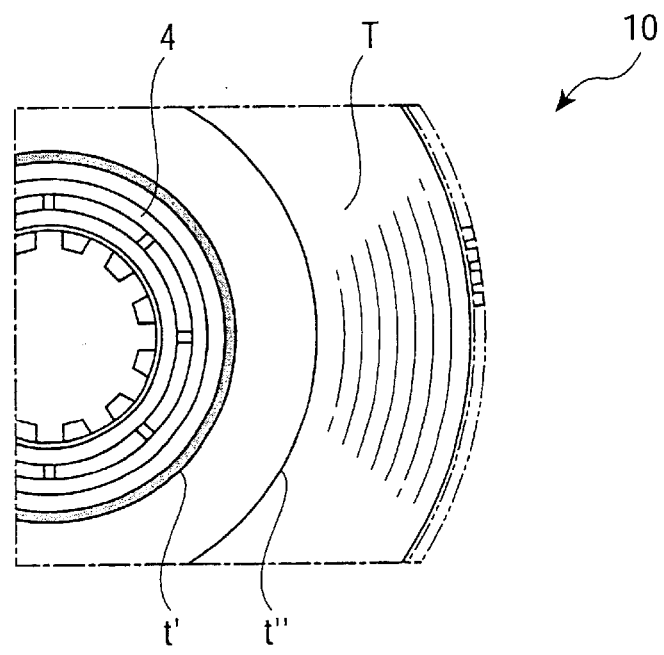

FIG. 9A shows a winding shape of the magnetic tape T wound on the tape reel 1, and FIG. 9B shows a winding shape of the magnetic tape T wound on the tape reel 10. In either case the upper flange was removed. As apparent from FIGS. 9A and 9B, the magnetic tape T wound on the conventional tape reel 10 had existence of circumference part t' and t" which became irregular by side edges having partially stuck out to the inner side, while side edges of the tape reel 1 of the present embodiment did not create irregularities, providing the magnetic tape with a good winding shape.

[Winding Looseness]

Figure 10:
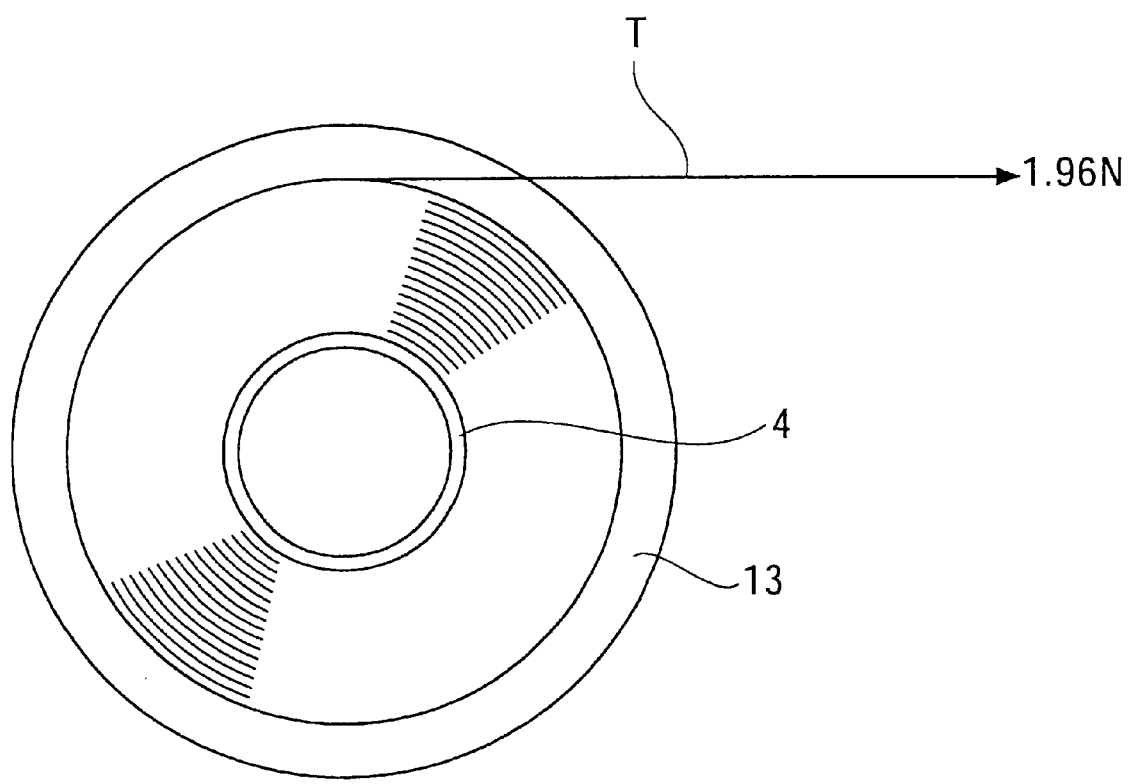
FIG. 10 is a view schematically showing a test method for looseness of a winding tape.

Regarding the tape reel 1 of the present embodiment and the conventional tape reel 10 as shown in FIG. 10, a spring balance was connected to the terminal of the magnetic tape T at the position where the wound diameter including the hub 4 is 100 mm, and when a force of 1.96N was applied to the tangential direction of the wound magnetic tape, pulled out length of the magnetic tape T was compared and the results are shown in Table 1.

TABLE 1

| Length of the magnetic tape pulled out from the tape reel | | |
|---|---|---|
| | Tape reel 1 of the embodiment | (Unit:mm) Conventional tape reel 10 |
| Length of the magnetic tape pulled out | 25–35 | 380–450 |

As apparent from the Table 1, it is understood that regarding the tape reel 1, the pulled-out length of the magnetic tape T is relatively short and accordingly the magnetic tape was tightly wound without looseness, while regarding the tape reel 10, the pulled-out length was relatively long and the tape was wound loosely.

As to the magnetic tape of the tape reel 1 and the magnetic tape of the tape reel 10, comparison was made regarding error rates of reproduced signals corresponding to the 4 heads reproduced from each of helically recorded video tracks of the magnetic tape; and each signal shapes of reproduced signals from longitudinally recorded tracks on the magnetic tape, wherein the tracks are a Time Code track for Time Code in the unit of a video frame, a Cue Audio Track for cue audio signal for a guideline of editing and a Control (CTL) Track for a control signal corresponding to a vertical synchronizing signal.

[Error Rate In The Reproduced Signal From The Video Track]

Figure 11A:
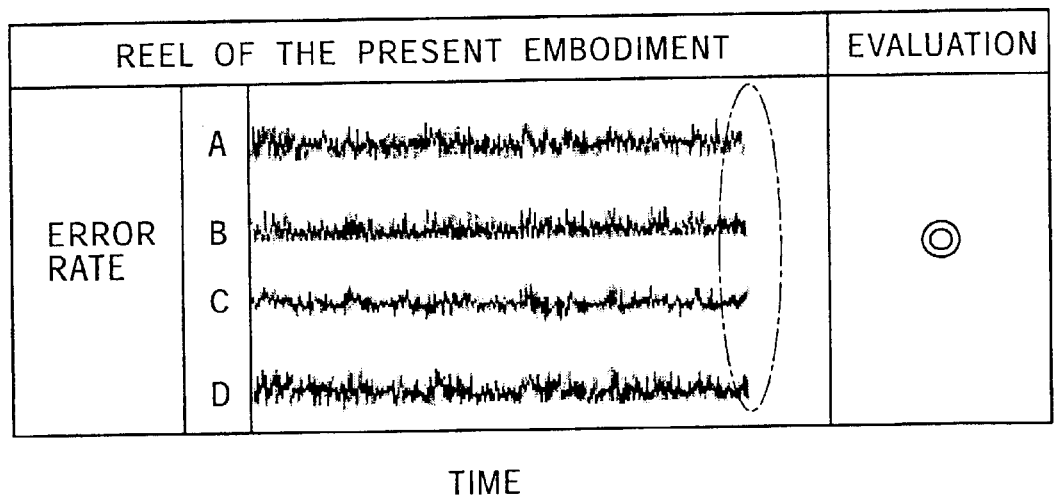
Figure 11B:
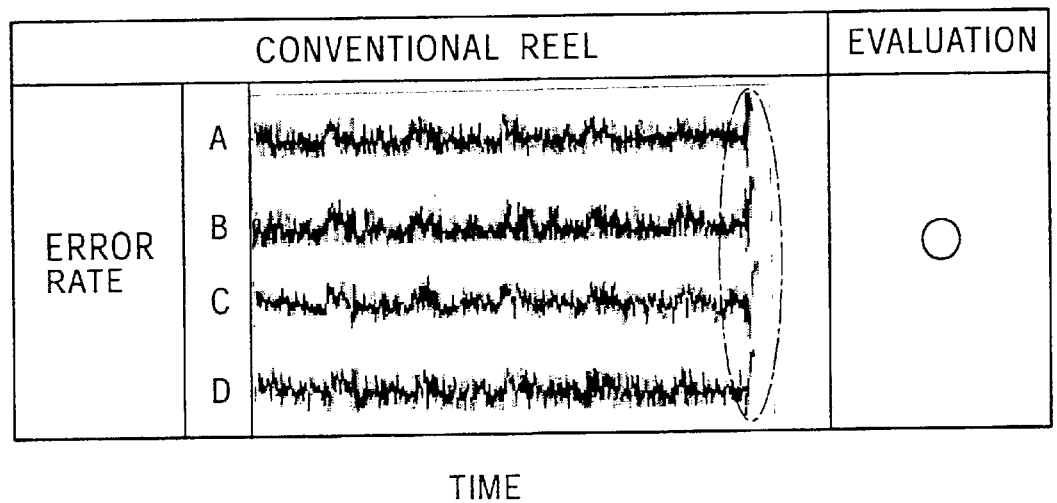

Regarding the video tracks of the magnetic tape T of the tape reel 1 according to the present embodiment and those of the magnetic tape T of the conventional tape reel 10, FIG. 11A and FIG. 11B are graphs showing error rates of reproduced signals from respective 4 heads in the vertical axis with respect to time in the horizontal axis.

Figure 12A:
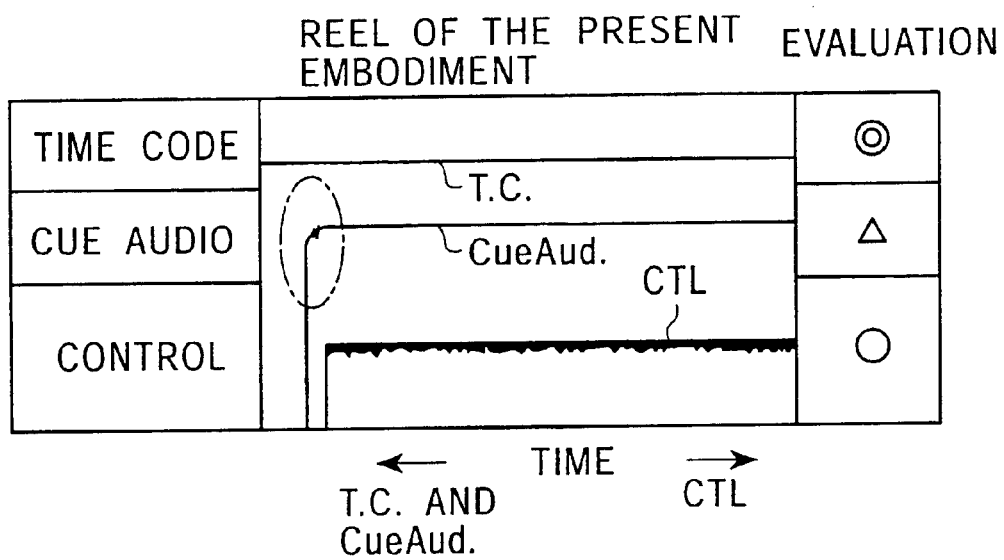
Figure 12B:
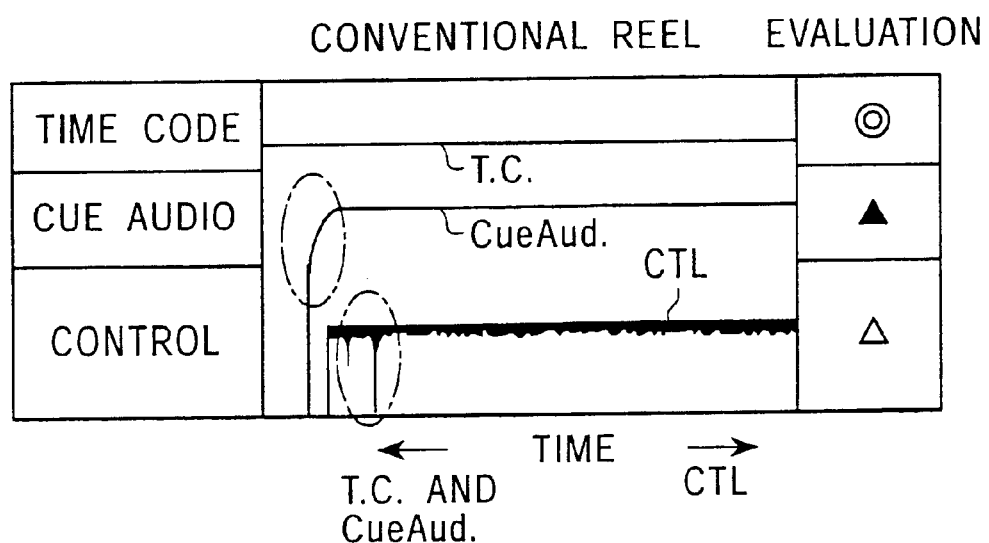

As apparent from the comparison of the parts encircled by ellipses in FIG. 11A and FIG. 11B, the magnetic tape T according to the conventional tape reel 10 has a little larger fluctuation, and as far as the error rates are concerned, the tape reel 1 of the present embodiment was superior to the conventional tape reel 10. Incidentally, as to the evaluations, a mark ⊚ means [excellent] and a mark ◯ means [good]. As shown in FIG. 12A and FIG. 12B described later, a mark Δ means [somewhat good] and a mark ▲ means [somewhat inferior].

[Signal Output Shapes of the Tracks of Longitudinal Direction]

FIGS. 12A and 12B are graphs showing the signal outputs of Time Code signal, Cue Audio signal and Control signal in the vertical axis with respect to time in the horizontal axis. Each of them was measured respectively by an individual measuring device, but they are shown in the same drawings in FIG. 12A and FIG. 12B. Incidentally, simply due to the measuring devices, the time axes of Time Code signal and Cue Audio signal proceed from the right to the left in the graph, while that of Control signal proceeds from the left to the right in the graph. FIG. 12A is the graph regarding the tape reel 1 of the present embodiment, and FIG. 12B is the graph regarding the conventional tape reel 10.

As seen in FIGS. 12A and 12B, the signal output shapes of Time Code (T.C.) signals were equally [excellent] having no difference. Regarding the signal output of Cue Audio signals, as apparent from the comparison of the parts encircled by ellipses, the signal falling shape of the signal from the tape on the tape reel 1 was comparatively sharp by which an evaluation was [somewhat good] while the start of the signal falling shape of the signal from the tape on the tape reel 10 was earlier and an evaluation was [somewhat inferior]. Also, regarding the signal output of Control (CTL) signals, the signal from the tape on the tape reel 10 had a large output signal dipping on the part encircled by an ellipse with evaluation being [somewhat good], while the signal from the tape on the tape reel 1 had no recognition of a large output signal dipping with evaluation being [good].

As described above, the structure and operation of the tape reel 1 of the present embodiment are described, but of course, the present invention is not limited to those structure and operation, and various changes and modifications may be made based on technical philosophy of the present invention.

For instance, in the present embodiment in FIG. 5, the tape reel 1 with 6 of concave portions 8 formed at even angle of 60 degrees is illustrated, but it may be accepted that the number of the concave portions 8 is 7 or more, or less than 6. Also, according to the present embodiment, the concave portions 8 are formed only inner surface of the lower flange 3 of the tape reel 1, but it may be accepted that they are also formed inner surface of the upper flange 2, or in the inner surfaces of both the upper flange 2 and the lower flange 3.

Figure 13A:
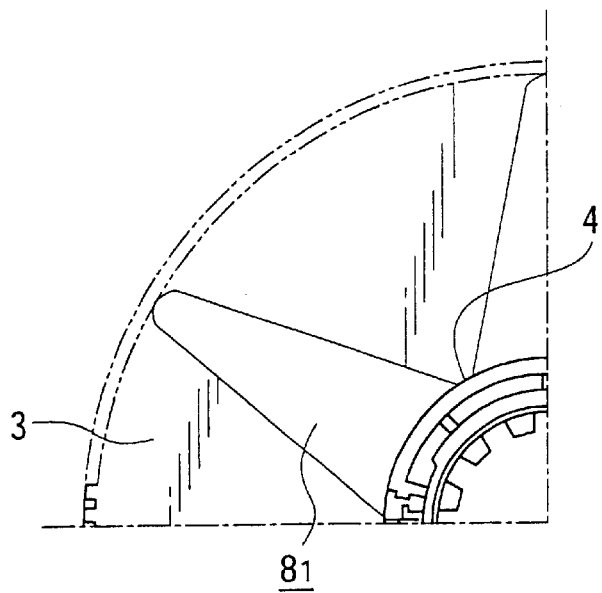
Figure 13B:
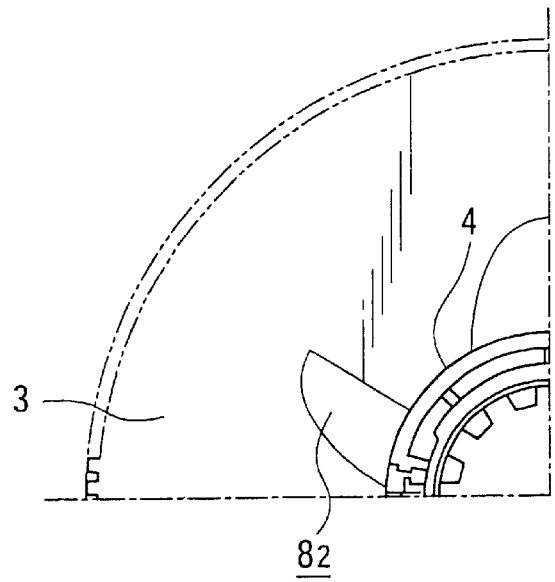
Figure 13C:
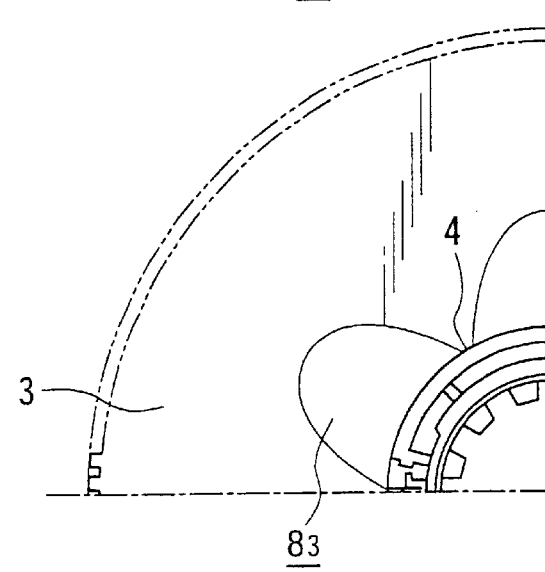

Also, according to the present embodiment, each shape of 6 concave portions 8 is made to be nearly an isosceles triangle in which the base is the outer periphery of the hub 4 and the apex is positioned at the distance about 40% away from the base to the outer periphery of the lower flange 3. As in the case of the concave portions $8_1$ shown in FIG. 13A, the shape may be accepted in which its apex is extended to the point touching the outer periphery of the flange 3. Besides, as in the case of the concave portions $8_2$ shown in FIG. 13B, the shape of nearly (¼) circle may be accepted, or as in the case of the concave portions $8_3$ shown in FIG. 13C, the semi-elliptic shape may be accepted. Namely, the shape of the concave portions to be formed is set up properly depending on the kind of the magnetic tape to be wound up, winding speed or the like.

In the present embodiment, description has been made by illustrating two-flange type tape reels installed in a tape cassette, but the present invention is similarly applicable to a tape cassette accommodating one-flange type tape reels.

In the present embodiment, tape reels applicable to a video tape cassette to be used for a broadcasting station are described as an example, where a magnetic tape cassette having tape reels which do not cause winding irregularities or deformation of a magnetic tape is explained. A tape cassette of the present invention is not limited to this, and besides a video tape cassette to be used for a broadcasting station having a different recording system, the present invention is also applicable not only to a video tape cassette for a general consumer use VTR, a tape cassette for data recorder, but also to various kinds of tape cassettes with tape reels on which an ink tape for a printer, a carrier tape for electronic parts or other tapes are wound.

In a tape cassette according to an aspect of the present invention, by providing concave portions which are formed so as to have the larger circumferential cross-section area as approaching to the inner side nearer to a hub unit of a tape reel, an amount of air caught in between a tape being wound up may become less as approaching to the inner side and become more as approaching to the outer periphery, so that a winding pressure of the tape at the outer periphery may be reduced and may not reach the tape at the inner side without incurring deformation of the tape. Furthermore, an amount of the air being caught between the tape is restrained by the concave portions, so that slide to the width direction between the overlapped tape may be restrained, preventing winding irregularities effectively.

In the tape cassette according to the present invention, the concave portions of the tape reel may have substantially constant depth to the circumferential direction and may have broader width as approaching to the inner side, so that mechanical strength of the tape reel may not be decreased by the concave portions, and an amount of escaped air may be increased as approaching to the inner side to provide a proper wound form of the tape.

In the tape cassette according to the present invention, the concave portions of the tape reel may have substantially constant depth to the radial direction, so that an amount of escaped air may be set up by the width of the concave portions.

In the tape cassette according to the present invention, the concave portions of the tape reel may have a little larger depth to the radial direction in their cross-sectional forms as approaching to the inner side, so that an amount of escaped air may further be increased gradually as approaching to the inner side to provide even more proper wound form.

In the tape cassette according to the present invention, the concave portions of the tape reel may have curved surfaces rounded at the corner from the wall surface to the bottom surface, so that smooth air flow may be created at the concave portions when the tape reel is rotated, and air caught in between the tape in quantity of more than need may effectively be restrained.

In the tape cassette according to the present invention, a plurality of the concave portions on the flange of the tape reel may be disposed at even angle intervals with the hub unit as their center, so that the tape reel may have a good rotation balance, and tape reel vibration may not occur at the time of high-speed rotation and a winding form of the tape is not deteriorated.

In the tape cassette according to the present invention, a plurality of the concave portions of the tape reel may be disposed in proximity to each other around the outer periphery of the hub, so that wound-in air may be escaped in equal quantity around the entire rim of the tape reel when the tape is wound up, providing the more enhancement of the winding form of the tape.

While preferred embodiments of the invention have been described, such description is for illustrative purpose only, and it is to be understood that changes and variations may be made without departing from the spirit and scope of the invention.

What is claimed is:

1. A tape cassette comprising
   a tape reel including a hub unit for winding a tape and a flange provided at said hub unit, and
   a tape shell for housing said tape reel, wherein
      said flange has plural concave portions for escaping air on an inner surface, and
      each cross-section area of each of said concave portions is made larger as approaching to the inner side nearer to said hub unit.

2. The tape cassette according to claim 1, wherein
   each of said concave portions has a substantially constant depth in the circumferential direction, and has a broader width as approaching to said inner side.

3. The tape cassette according to claim 2, wherein each of said concave portions has a substantially constant depth in a cross-sectional form in a radial direction.

4. The tape cassette according to claim 2, wherein each of said concave portions has a larger depth in the cross-sectional form of the radial direction as approaching to said inner side.

5. The tape cassette according to claim 1, wherein each of said concave portions has a curved surface at corner edges.

6. The tape cassette according to claim 1, wherein said plural concave portions are disposed at even angle intervals with said hub unit as a center.

7. The tape cassette according to claim 6, wherein said plural concave portions are disposed in proximity to each other around an outer periphery of said hub unit.

8. A magnetic tape cassette comprising:

a magnetic tape;

a hub unit for winding said magnetic tape, at least a flange provided at said hub unit, and a tape cassette shell for housing said magnetic tape, said hub unit and said flange; wherein said flange has plural concave portions on an inner surface, and each of said concave portions is made larger in its cross-section area as approaching toward said hub unit.

9. The magnetic tape cassette according to claim 8, wherein said plural concave portions are disposed at even angle intervals with said hub unit as a center.

10. A tape reel comprising:

a hub unit for winding a tape; and at least one flange attached to said hub unit, wherein said flange has plural concave portions and each of said concave portions being made narrower toward an outer periphery of said flange.

11. The tape reel according to claim 10, wherein said plural concave portions are disposed at even angle intervals with said hub unit as a center.

* * * * *